United States Patent
Xiao et al.

(10) Patent No.: US 11,416,274 B2
(45) Date of Patent: Aug. 16, 2022

(54) BRIDGING A CONNECTION TO A SERVICE BY WAY OF A CONTAINER TO VIRTUALLY PROVIDE THE SERVICE

(71) Applicant: International Business Machines Corporation, Armonk, NY (US)

(72) Inventors: Ping Xiao, Beijing (CN); Guan Jun Liu, Beijing (CN); Guo Qiang Li, Beijing (CN); Zhi Feng Zhao, Wuhan (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 16/213,098

(22) Filed: Dec. 7, 2018

(65) Prior Publication Data

US 2020/0183721 A1   Jun. 11, 2020

(51) Int. Cl.
*G06F 9/455* (2018.01)
*H04L 12/46* (2006.01)

(52) U.S. Cl.
CPC .......... *G06F 9/45558* (2013.01); *H04L 12/46* (2013.01); *G06F 2009/4557* (2013.01); *G06F 2009/45595* (2013.01)

(58) Field of Classification Search
CPC ........ G06F 9/45558; G06F 2009/4557; G06F 2009/45595; G06F 2009/45587; H04L 12/46

See application file for complete search history.

(56) References Cited

U.S. PATENT DOCUMENTS

| 7,174,363 B1 * | 2/2007 | Goldstein | G06F 9/546 709/203 |
| 7,401,131 B2 * | 7/2008 | Robertson | G06Q 10/10 707/999.01 |

(Continued)

FOREIGN PATENT DOCUMENTS

| CN | 105978781 A | 9/2016 |
| WO | 2016041421 A1 | 3/2016 |

OTHER PUBLICATIONS

Cerrato et al., "Composer: A compact open-source service platform", Computer networks 139 (2018) pp. 151-174, Apr. 2018 (Year: 2018).*

(Continued)

*Primary Examiner* — Lewis A Bullock, Jr.
*Assistant Examiner* — Kevin X Lu
(74) *Attorney, Agent, or Firm* — Cantor Colburn LLP; Teddi Maranzano

(57) ABSTRACT

A computer-implemented method includes detecting, by a bridge container running inside a container scope, connection information about a first service instance running to provide a respective first service outside the container scope. A first virtual container is initialized inside the container scope. The first virtual container is connected to the first service instance, utilizing the connection information about the first service instance, to virtualize the first service instance inside the container scope. It is detected that that a first source container inside the container scope requires the first service of the first service instance. The first source container is connected to the first virtual container to enable the first source container to access the first service instance through the first virtual container.

14 Claims, 9 Drawing Sheets

(56) References Cited

U.S. PATENT DOCUMENTS

| | | | |
|---|---|---|---|
| 9,733,992 B1 | | 8/2017 | Poeluev et al. |
| 10,623,390 B1* | | 4/2020 | Rosenhouse ........ H04L 61/2525 |
| 2016/0380916 A1 | | 12/2016 | Gnaneswaran et al. |
| 2017/0099313 A1* | | 4/2017 | Singuru .............. G06F 9/45558 |
| 2017/0206071 A1* | | 7/2017 | Kirkpatrick ............... G06F 8/61 |
| 2017/0257432 A1* | | 9/2017 | Fu ....................... H04L 67/2823 |
| 2019/0020559 A1* | | 1/2019 | Cao ..................... G06F 11/3079 |
| 2019/0363905 A1* | | 11/2019 | Yarvis ....................... G06F 8/60 |
| 2019/0391841 A1* | | 12/2019 | Mullen ................. G06F 9/5077 |
| 2020/0052982 A1* | | 2/2020 | Nainar ................. H04L 43/028 |

OTHER PUBLICATIONS

Charu Chaubal, "Connecting Containers Directly to External Networks," vmware.com; URL: https://blogs.vmware.com/vsphere/author/charu_chaubal. Posted Feb. 6, 2017. Retrieved Dec. 19, 2017. 4 pages.

Heiner, "Docker Compose: Link containers outside compose file using external_links" URL: https://blog.virtualzone.de/2016/09/docker-compose-link-containers-outside-compose-file-using-external_links.html. Sep. 17, 2016. Retrieved Dec. 19, 2017. 6 pages.

* cited by examiner

FEATURE PATTERN TABLE 155

| SERVICE TYPE | START JOB PATTERN | START SUCCESSFULLY MESSAGE | SERVICE FEATURE PATTERN | SERVICE INQUIRE RESTFUL API | JOB LOG MESSAGE | SERVICE PROPERTIES |
|---|---|---|---|---|---|---|
| DB2 | DB<PARName>xxx | DSNLxxx: xxx stated successfully | {Key words, DB2}: table name, ports, ip addr | restconsoles/ consoles/ defcn/ inquire DBTable | Db2 table xxx has been set up and ready for service | DB2 Name; DB2 TableName; Table properties; |
| CICS | DFH<xx><xxx> | DFHSI1xxx: Control has been given to CICS | {Key words, IP connection} Host, port, ssl etc. | restconsoles/ consoles/ defcn/ inquire IPIConnection | Ipic connection has been established | System name; IPconnection Name; Port number; Ip address |
| Others (zcee, liberty, etc) | ... | ... | ... | ... | ... | |

FIG. 6

SERVICE LOCATION TABLE (160)

| INSTANCE ID | SERVICE NAME | CONNECTION DETAILS | CONNECTION PROPERTIES | ACTIVE STATUS |
|---|---|---|---|---|
| DJ2C | DB Service | Table, {Share option, Shareable}, {name, abcBankTransferDB}, {SECURITY POLICY:None}, | {running system, 9.120.3.20}, {Port, 20332}.... | Active |
| CICPD001 | BACKEND APP | IPConnection{SSLOption:Yes}, {Receive account: 5}, ... | {running system, 9.120.3.25}, {Port, 14890}.... | Active |
| ZCEESVR1 | | ... | ... | ... |

FIG. 7

VIRTUAL SERVICE REGISTRY 185

| APPLICATION NAME | SERVICE NAME | INSTANCE ID | VIRTUAL CONTAINER ID | ACTIVE STATUS | PROVISION FILE |
|---|---|---|---|---|---|
| bankApp(with properties) | DB@(with properties) | DB2J | ContainerA | DB2J(Active) | DB2J.prov |
| App01 | Service01 | InstanceName01, InstanceName02 | N/A | InstanceName01(active) InstanceName02(inactive) | instanceName01.prov instanceName02.prov |
| App02 | Service02 | InstanceName03, InstanceName04 | ContainerB | ... | ... |
| ... | | | | | |

FIG. 8

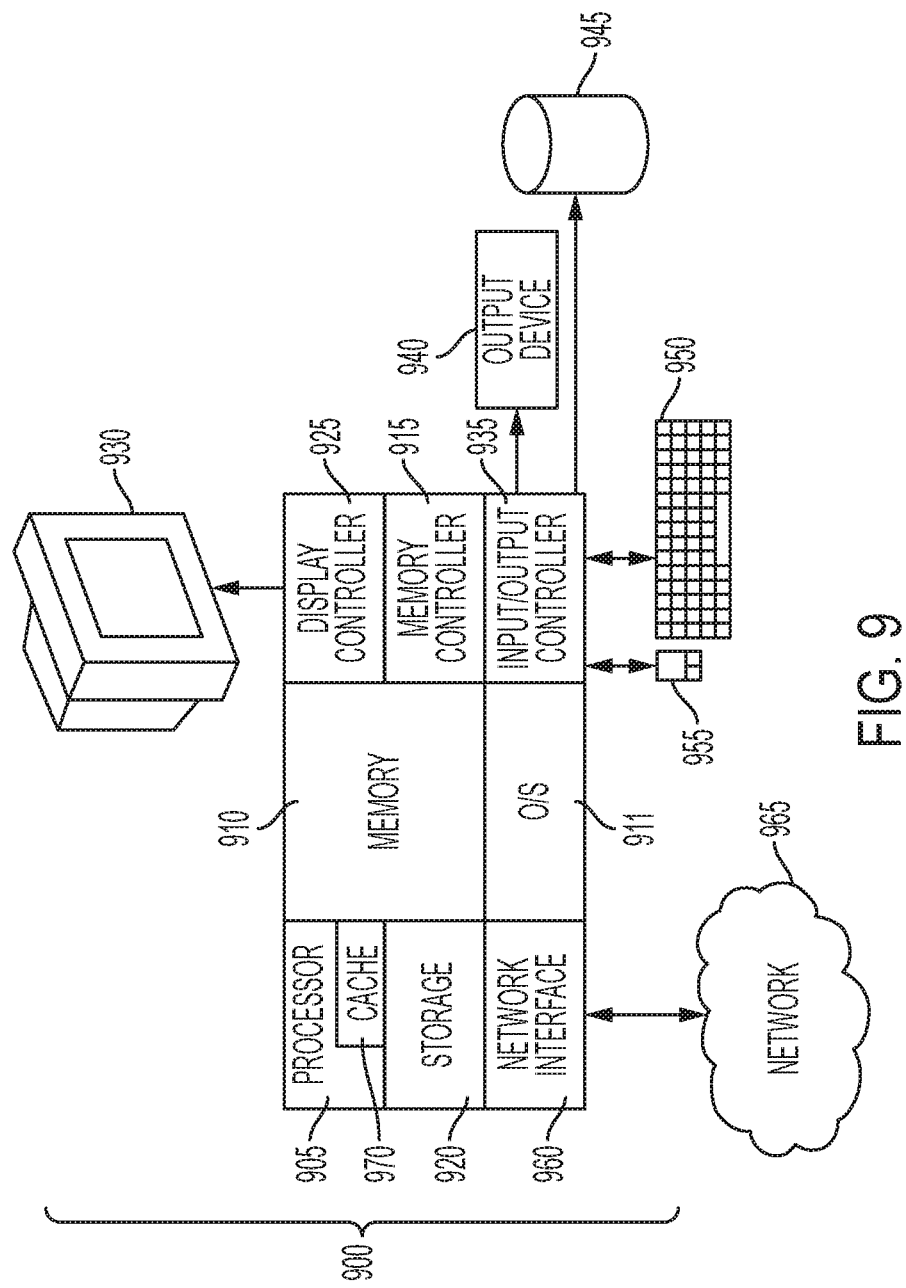

BRIDGING A CONNECTION TO A SERVICE BY WAY OF A CONTAINER TO VIRTUALLY PROVIDE THE SERVICE

BACKGROUND

The present invention relates to container software and, more specifically, to bridging a connection to a service by way of a container to virtually provide the service.

Containerization is a virtualization method, typically at the level of an operating system (OS), for deploying and running applications without launching an entire virtual machine for each application. A container holds components such as files, libraries, and the environment configuration necessary to run desired software. Containerization can result in efficiency gains in memory, processing, and storage compared to traditional virtualization. Compared to virtual machines, containers can place less strain on available computing resources because they typically share a kernel of the applicable operating system, as well as other resources such as storage and networking. Because containers do not need the overhead required to run VMs, it is possible to support many more containers on the same infrastructure as compared to VMs.

Because a container includes its own environment, containers can be migrated across host computing environments, such as computing systems, clouds, or other environments, without requiring code changes. Thus, containers can provide a high level of portability. Containers therefore enable users to create, execute, and isolate applications in a lightweight and portable manner.

SUMMARY

Embodiments of the present invention are directed to a computer-implemented method for bridging a connection to a service instance outside a container scope. A non-limiting example of the computer-implemented method includes detecting, by a bridge container running inside a container scope, connection information about a first service instance running to provide a respective first service outside the container scope. A first virtual container is initialized inside the container scope. The first virtual container is connected to the first service instance, utilizing the connection information about the first service instance, to virtualize the first service instance inside the container scope. It is detected that that a first source container inside the container scope requires the first service of the first service instance. The first source container is connected to the first virtual container to enable the first source container to access the first service instance through the first virtual container.

Embodiments of the present invention are directed to a system for bridging a connection to a service instance outside a container scope. A non-limiting example of the system includes a memory having computer-readable instructions and one or more processors for executing the computer-readable instructions. According to the computer-readable instructions, a bridge container running inside a container scope detects connection information about a first service instance running to provide a respective first service outside the container scope. Further according to the computer-readable instructions, a first virtual container is initialized inside the container scope. The first virtual container is connected to the first service instance, utilizing the connection information about the first service instance, to virtualize the first service instance inside the container scope. It is detected that that a first source container inside the container scope requires the first service of the first service instance. The first source container is connected to the first virtual container to enable the first source container to access the first service instance through the first virtual container.

Embodiments of the invention are directed to a computer-program product for bridging a connection to a service instance outside a container scope, the computer-program product including a computer-readable storage medium having program instructions embodied therewith. The program instructions are executable by a processor to cause the processor to perform a method. A non-limiting example of the method includes detecting, by a bridge container running inside a container scope, connection information about a first service instance running to provide a respective first service outside the container scope. Further according to the method, a first virtual container is initialized inside the container scope. The first virtual container is connected to the first service instance, utilizing the connection information about the first service instance, to virtualize the first service instance inside the container scope. It is detected that that a first source container inside the container scope requires the first service of the first service instance. The first source container is connected to the first virtual container to enable the first source container to access the first service instance through the first virtual container.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 is an example feature pattern table in the bridging system, according to some embodiments of the invention FIG. 7 is an example service location table in the bridging system, according to some embodiments of the invention;

FIG. 8 is an example virtual service registry in the bridging system, according to some embodiments of the invention; and FIG. 9 is a block diagram of a computer system for implementing some or all aspects of the bridging system, according to some embodiments of this invention.

Figure 1:
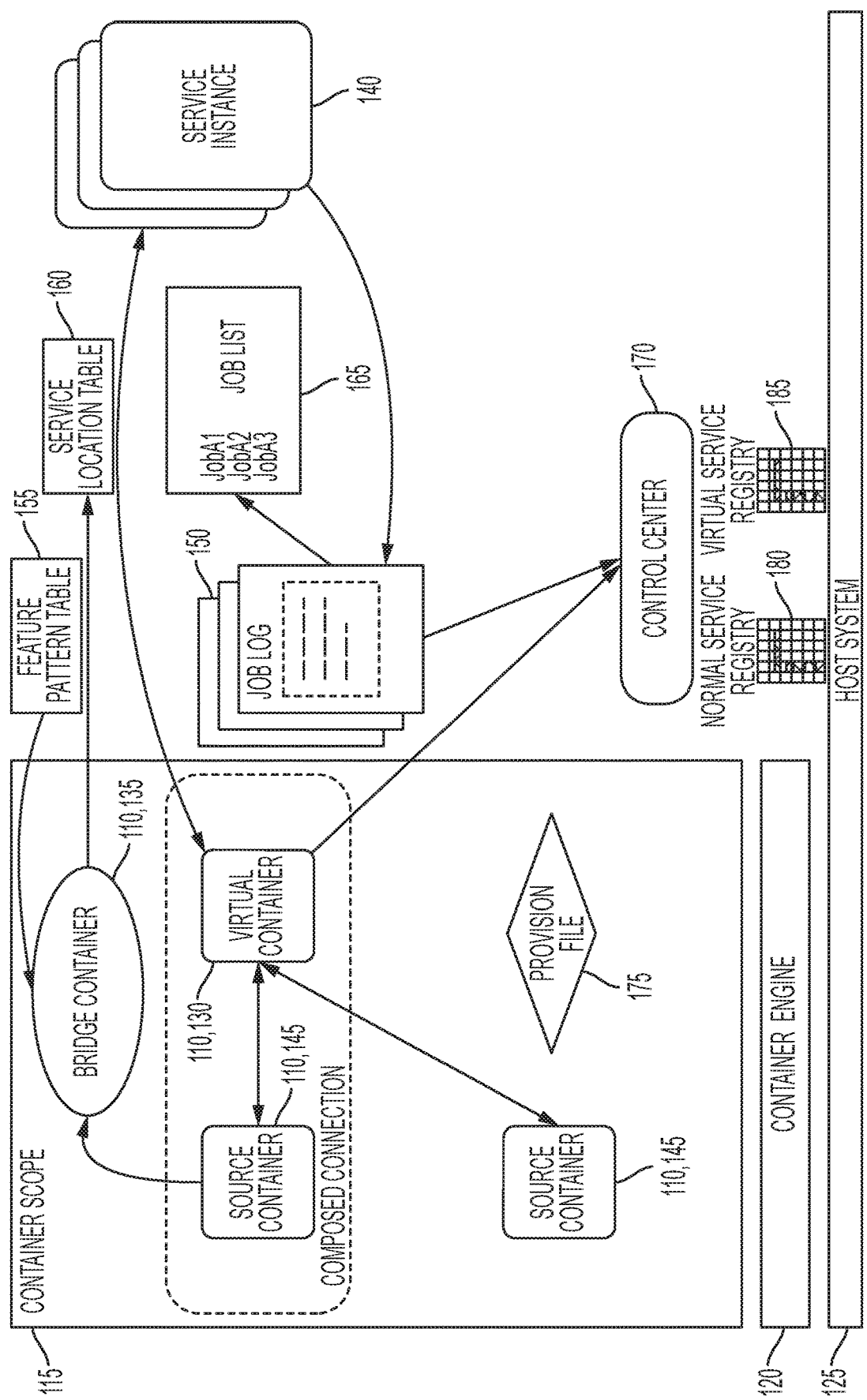
FIG. 1 is a block diagram of a bridging system for bridging a connection between a container and a service instance running outside a container scope, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, containers are isolated from the deployment environment in which they are running with respect to aspects such as their namespaces, available resources, file system, environment variables, and configuration. Connections between containers can be established relatively easily through native functions, such as Docker® Compose in the Docker container platform. However, in some systems, such as legacy systems that already have existing services outside of containers, some workload may be performed within containers while other workload is performed outside of containers. In such systems, software inside containers and outside containers must coexist and communicate, which can be difficult given that containers are designed to provide isolated environments. This has been addressed by hard-coding, in containers, the necessary connection information to connect with service instances running outside a container scope. However, this method lacks flexibility, as changes must be hard-coded as well. Further, such changes will typically require a shutdown and restart, which can temporarily take services offline.

Turning now to an overview of the aspects of the invention, one or more embodiments of the invention address the above-described shortcomings of the prior art by providing a bridge container that monitors which service instances are required by various source containers running inside a container scope. The bridge container may also detect connection information about service instances running on a host with the bridge container, but outside the container scope. For each such service instance, a virtual container may be initialized to virtualize the applicable service, such that the virtual container connects directly to the service instance, and such that source containers utilize the service instance through the virtual container. In some embodiments of the invention, because the virtual container behaves as a single entry point to the service instance, only the virtual container needs to be updated when a change is made to connection information for the service instance.

The above-described aspects of the invention address the shortcomings of the prior art by dynamically bridging the connections between source containers inside container scope and service instances outside container scope. As a result, individual source containers do not need to be hard-coded with information about outside service instances, which maintains the flexibility and portability that is so desirable in container usage. Embodiments of the invention provide a flexible solution that can be updated without taking services offline, and without modifying hard-coding in every container utilizing such outside service instances.

Turning now to a more detailed description of aspects of the present invention, FIG. 1 is a block diagram of a bridging system 100 for bridging a connection between a source container 145 inside a container scope 115 and a service instance 140 outside the container scope 115, according to some embodiments of the invention. As shown in FIG. 1, the bridging system 100 may include a set of containers 110 within a container scope 115 provided by a container engine 120 on a host system 125. In some embodiments of the invention, these containers 110 include one or more virtual containers 130, and at least one bridge container 135. Each virtual container 130 may provide a virtual service corresponding to a service instance 140 outside the container scope 115, and through the virtual containers 130, the bridge container 135 may bridge each connection to an outside service instance 140. A source container 145 may utilize one or more service instances 140 outside of the container scope 115 by connecting to each respective virtual container 130 that is virtualizing such service instances 140.

Generally, the bridge container 135 may also scan the service instances 140 to determine various information, such as their connection information and job log 150. As will be described below, a feature pattern table 155, which defines the features of each supported service, may serve as a basis for this scan, and the connection information determined during the scan may be written to a service location table 160. For each such service instance 140, a virtual container 130 may be initialized to virtualize the applicable service, such that the virtual container 130 connects directly to the service instance 140, and such that source containers 145 utilize the service instance 140 through the virtual container 130. From the job log 150 of a service instance 140, the bridge container 135 may extract a job list 165, where the job list 165 is a list of jobs being handled by the service instance 140. In some embodiments of the invention, the job list 165 may be displayed to a user by default or upon request from the user.

A control center 170 may be a management point of the bridging system 100 from outside the container scope 115. The control center 170 may monitor the job logs 150 and the service instances 140. Based on the job log 150, the control center 170 may maintain a provision file 175 for each service instance 140, where the provision file 175 is usable to restart a service instance 140 after failure. The control center 170 may monitor heartbeats of each service instance 140 to determine whether the service instance 140 is running as expected. Additionally or alternatively, the control center 170 may maintain a normal service registry 180 and a virtual service registry 185, where the normal service registry 180 maintains information about services running in containers 110 of various types, and the virtual service registry 185 may maintain information about services virtualized through virtual containers 130.

In some cases, as in the example of FIG. 1, the virtual container 130 providing a service, by way of a service instance 140, may run within a composed connection (e.g., a connection provided through Docker Compose) that also includes a source container 145 utilizing that service. However, it will be understood by one skilled in the art that other native mechanisms exist in container systems to support connections between containers 110 even if such containers 110 do not share a composed connection.

Figure 2:
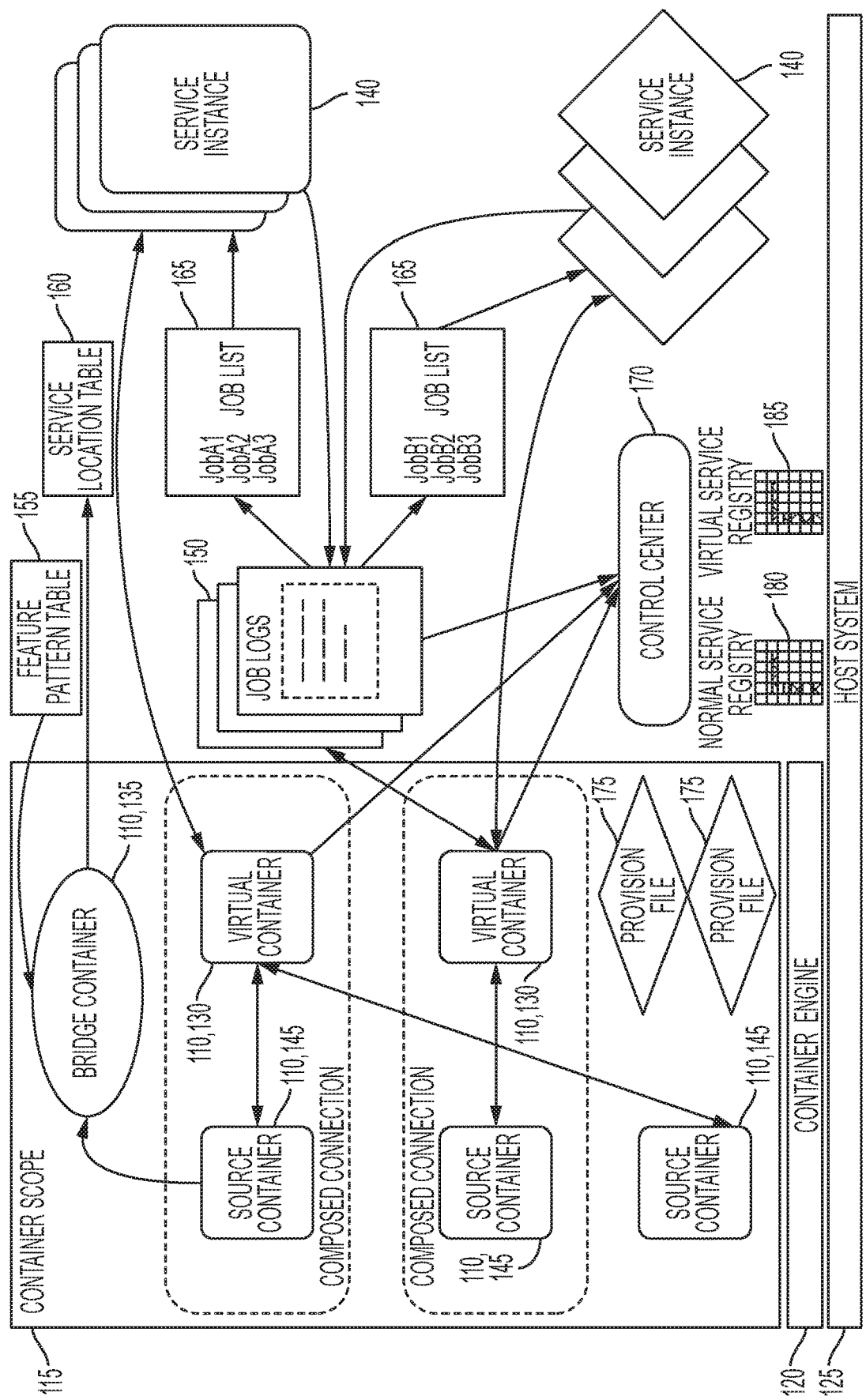
FIG. 2 is another diagram of the bridging system, with multiple service instances, according to some embodiments of the invention.

FIG. 2 is another diagram of the bridging system 100, this time with multiple service instances 140, according to some embodiments of the invention. As shown in FIG. 2, multiple source containers 145 may connect with a virtual container 130 to utilize the service associated with that virtual container, and further, a source container 145 need not run with a composed connection to the virtual container 130 in order to access the virtual container's virtualized service. Additionally or alternatively, although not shown, a source container 145 may connect with multiple virtual containers 130 to access multiple respective service instances 140 running outside the container scope 115.

In some embodiments of the invention, as shown in FIG. 2, a corresponding job list 165 may be provided for each service instance 140. Additionally or alternatively, as shown in FIG. 2, the bridging system 100 may maintain a respective provision file 175 for each service instance 140.

Figure 3:
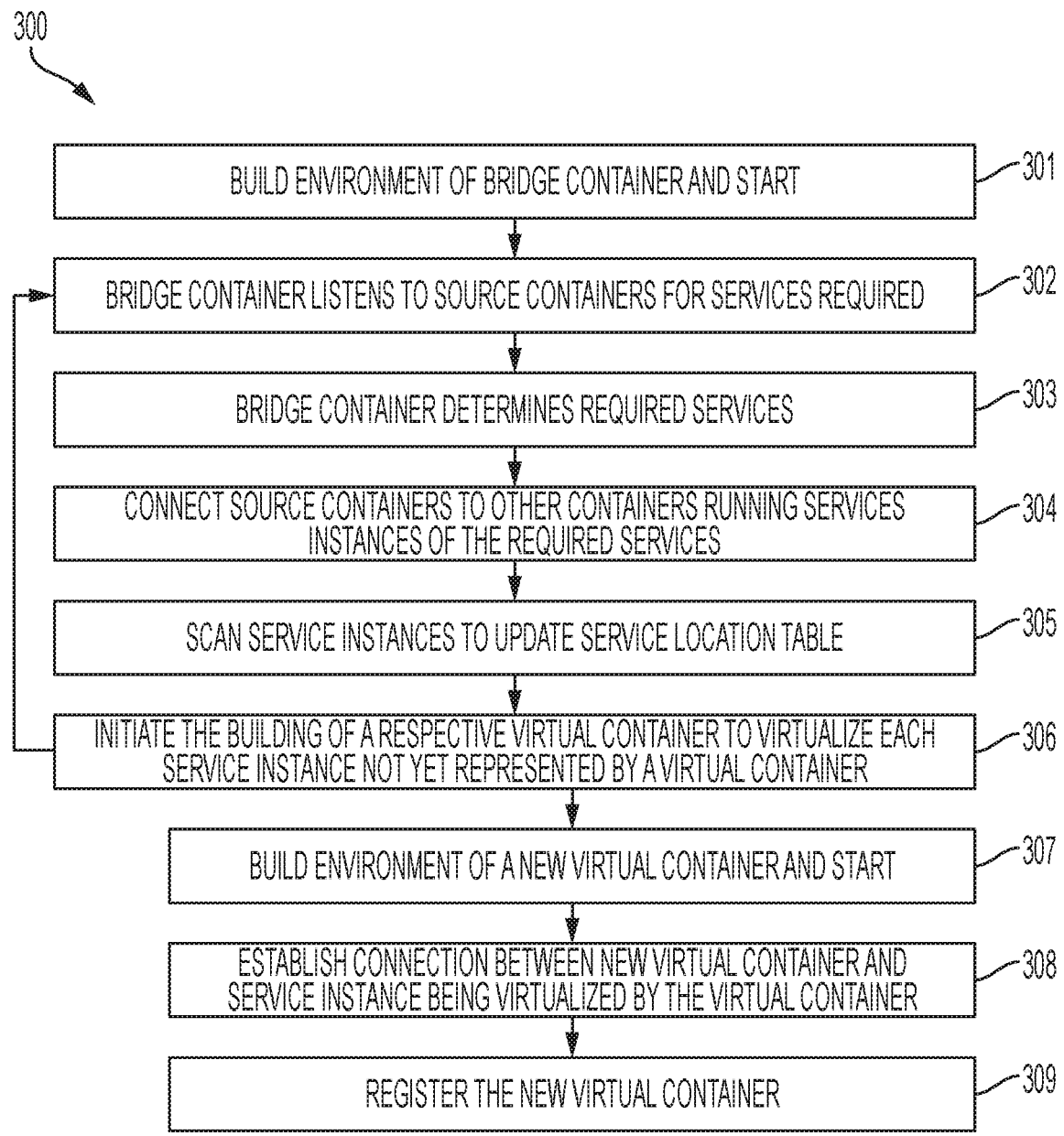
FIG. 3 is a flow diagram of a method of bridging the connection to each of one or more service instances in the bridging system, according to some embodiments of the invention.

FIG. 3 is a flow diagram of a method 300 of bridging a connection to each of one or more service instances 140 in the bridging system 100, according to some embodiments of the invention. As described above, the bridging system 100 may include one or more source containers 145, one or more virtual containers 130, and a bridge container 135. Although only a single virtual container 130 is shown and described with respect to this method 300, it will be understood that similar operations to those shown and described with respect to the virtual container 130 may be performed for each service instance 140.

As shown in FIG. 3, at block 301, the environment of the bridge container 135 is built, and the bridge container 135 is started. The building of the environment may be dependent on the container software used and may comply with conventional methodology for building containers 110. At block 302, the bridge container 135 listens to broadcasts of the source containers 145 to identify required services (i.e., services that are required by the source containers 145). At block 303, the bridge container 135 determines which required services are available, for instance, by checking the normal service registry 180 and the virtual service registry 185 to determine whether either registry indicates the existence of such services.

At block 304, for each service that is required by a source container 145 and already supported (e.g., is registered in the normal service registry 180 or the virtual service registry 185), the bridge container 135 may connect the source container 145 requiring that service to another container 110 associated with the service. That other container 110 may locally run the service instance 140 or may be a virtual container 130 virtualizing the service instance 140. The method 300 then returns to block 302 to continue listening for services required by the source containers 145.

At block 305, to update records regarding service instances 140, the bridge container 135 may occasionally scan service instances 140 outside the container scope 115, to update the service location table 160 as needed. This scanning may discover new service instances 140 or update data maintained about known service instances 140. In some embodiments of the invention, this scan may be based on the feature pattern table 155, as will be described in detail below.

At block 306, for each service instance 140 for which a virtual container 130 does not yet exist, the bridge container 135 may initiate the building of a new virtual container 130 to virtualize the service instance 140. The activities of blocks 302 through 306 may be performed repeatedly so as to dynamically connect source containers 145 to services as needed.

Blocks 307 to 309 describe the initialization of a virtual container 130 to virtualize a service instance 140, where that service instance 140 is running outside the container scope 115. The operations of these blocks may be performed when building a new virtual container 130 for a service instance 140 not yet represented by a virtual container 130. At block 307, an environment of the virtual container 130 may be built, and the virtual container 130 may be started. At block 308, based on the service location table 160, a connection may be established between the virtual container 130 and the service instance 140 being represented, or virtualized, by the virtual container 130. In some embodiments of the invention, this is a two-way connection, enabling communications in both directions between the virtual container 130 and the service instance 140.

As described in more detail below, the service location table 160 may include a record corresponding to each known service instance 140. The service location table 160 may include the following columns, for example: Service Name (e.g., DB service), Connection Details, Connection Properties, and Active Status (e.g., active, inactive). Generally, the service location table 160 may include, for each service, enough details to enable connection to the service instance 140 and use of the service instance 140. In some embodiments of the invention, to incorporate a connection to a service instance 140 into the virtual container 130, information from the service location table 160 (e.g., the connection details and connection properties) may be hard-coded into the virtual container 130. Thus, the virtual container 130 may behave as an entry point to the service instance 140. In some embodiments of the invention, if a change is needed for connection to the service instance 140, that change is incorporated into the respective virtual container 130 without need to update the source containers 145. Source containers 145 utilizing the service instance 140 through the virtual container 130 need not concern themselves with connection details to the service instance 140, because the virtual container 130 bridges that connection in some embodiments of the invention.

At block 309, the virtual container 130 is registered. For instance, the virtual container 130 may communicate with the control center 170, which may update the virtual service registry 185 and the normal service registry 180 with information about the virtual container 130 and its service instance, or the bridge container 135 may communicate with the control center 170 to do so. Based on these registries, the bridge container 135 may identify the services provided by the various virtual containers 130. These registries may be used when matching source containers 145 to their required services, as described below.

Figure 4:
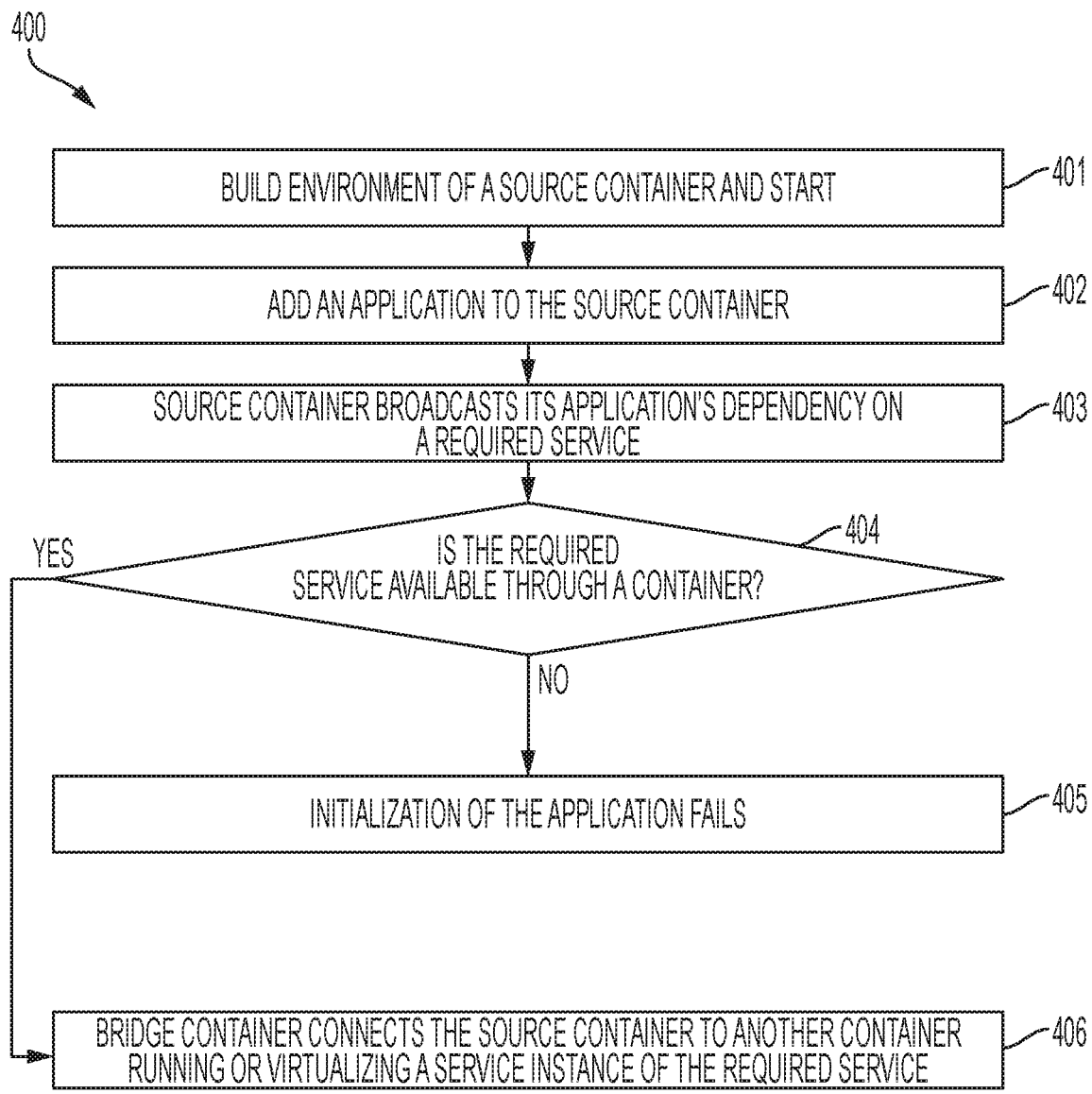
FIG. 4 is a flow diagram of a method of starting a source container that requires a service instance running outside the container scope, according to some embodiments of the invention.

FIG. 4 is a flow diagram of a method of starting a source container 145 that requires a service running as a service instance 140 outside the container scope 115, according to some embodiments of the invention. Although only a single source container 145 is shown and described with respect to this method 400, it will be understood that similar operations to those shown and described may be performed for each of multiple source containers 145 utilizing services outside the container scope 115.

As shown in FIG. 4, at block 401, the environment of a new source container 145 is built, and the source container 145 is started. At block 402, an application may be added to the source container 145, where that application is dependent on a required service not available in the container scope 115. Blocks 401 and 402 may be performed according to typical operations involved to initiate a container 110, as understood by one skilled in the art. At block 403, the source container 145 broadcasts this dependency, indicating its needs for the required service. As described above, the bridge container 135 may listen for this broadcast.

At decision block 404, the bridge container 135 may determine whether the required service for the source container 145 is available through another container 110. For instance, this determination may be made by checking the normal service registry 180, which indicates services provided by containers 110, and by checking the virtual service registry 185, which indicates services virtualized by virtual containers 130. If the required service is deemed unavailable, then at block 405, the initialization of the application fails in the source container 145. However, if the required service is deemed available, then at block 406, the bridge container 135 connects the source container 145 to the container 110 providing a service instance 140 of the required service. This latter container 110 may be a virtual container 130 or a container 110 that is not a virtual container 130, depending on whether the service instance 140 is being virtualized by a virtual container 130 or is actually running within the container scope 115.

Figure 5:
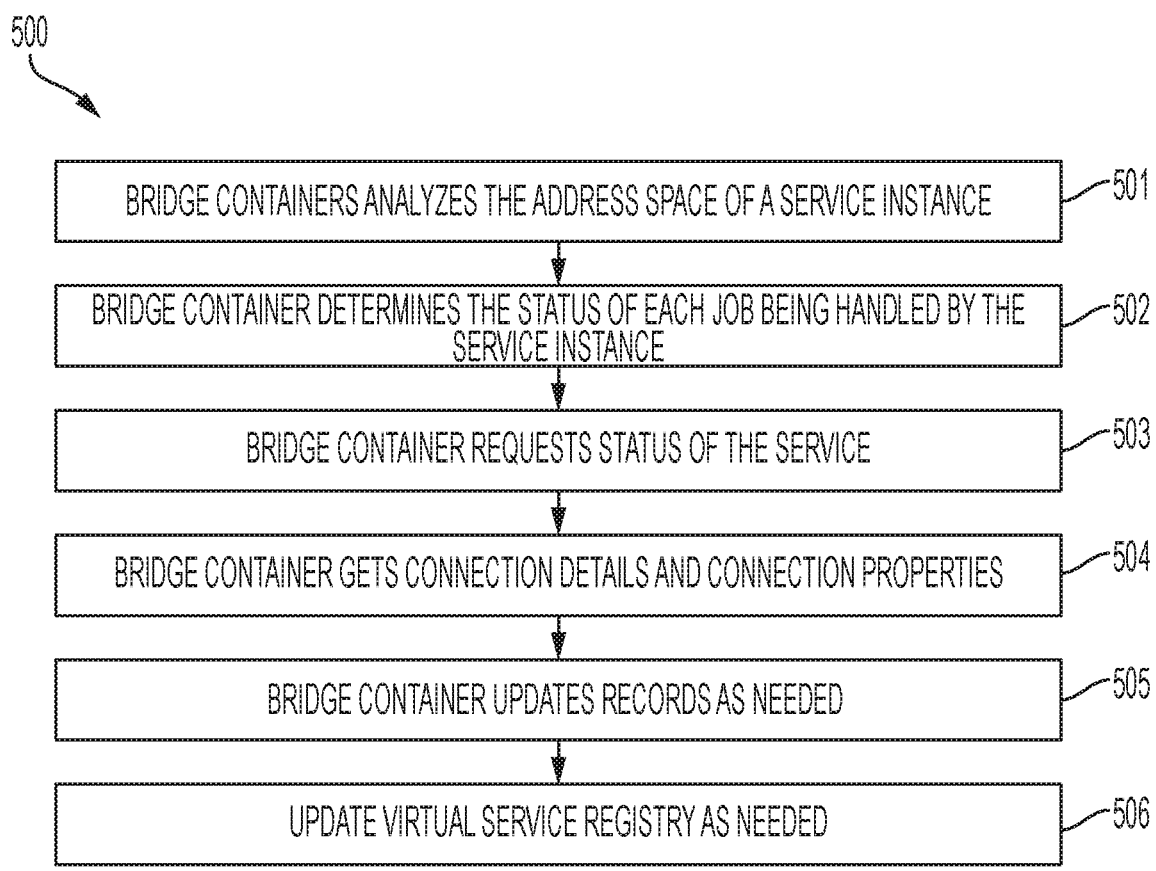
FIG. 5 is a flow diagram of a method of scanning service instances in the bridging system, according to some embodiments of the invention.

As described above with respect to FIG. 3 and the method 300 for bridging services, the bridge container 135 may scan service instances 140 running outside the container scope 115. FIG. 5 is a flow diagram of a method 500 of scanning service instances 140, which may be performed by the bridge container 135 according to some embodiments of the invention. It will be understood, however, that other components may perform this method 500 or similar in addition to, or alternatively to, the bridge container 135. More specifically, this method 500 may be performed at block 309 of the method 300 for connecting source containers 145 to service instances 140 running outside the container scope 115.

This method 500 may utilize the feature pattern table 155, which provides guidance with respect to the utilization of services. Each supported service may be represented by a record (e.g., a row) of the feature pattern table 155. In some embodiments of the invention, the feature pattern table 155 is populated manually, or automatically, as an initialization step or to update supported services.

FIG. 6 is an example feature pattern table 155 according to some embodiments of the invention. Generally, the feature pattern table 155 describes features of various services. The feature pattern table 155 may include information necessary for the bridge container 135 to recognize which service is being run by a service instance 140. For example, as shown in FIG. 6, the feature pattern table 155 may include the following columns, where "RESTful API" refers to an Application Programming Interface (API) that adheres to constraints of Representational State Transfer (REST): Service Type, Start Job Pattern, Start Successfully Message, Service Inquire RESTful API, Job Log Message, and Service Properties. These fields enable the bridge container 135 to recognize the service provided by a service instance 140 (e.g., based on the Start Job Pattern and the Start Successfully Message) and enable the virtual container 130 to utilize that service (e.g., through using the Service Feature Pattern, the Service Inquire RESTful API, and the Service Properties).

For example, if a service instance 140 provides a DB2 database service, then jobs of that service instance 140 are expected to have jobs named "DB<LPARName>xxx," where <LPARName> is the name of a partition in which the service instance 140 is running, and where "xxx" is variable. For each job, a log message that indicates the job is healthy is expected to have the pattern "DSNLxxx: xxx started successfully," as shown in the "Start Successfully Message" column, and a log message indicating that a service is ready, as shown in the "Job Log Message" column. The information shown in the Service Inquire RESTful API column indicates how to access a service instance's services or data through a RESTful API. For instance, in the example of FIG. 6, the DB2 instance may contain more than one service, and thus there may be more than a single item in the Service Inquire RESTful API column to access such services. When querying a service instance 140, typically, key information is required to define the query, and useable key information is provided in the Service Feature Pattern column and the Service Properties column.

As mentioned above, the feature pattern table 155 may be utilized in a method 500 for scanning for available service instances 140. Specifically, having identified service instances 140 running on the host system 125, the bridge container 135 may use this method 500 or similar to determine which services the various service instances 140 support and to match source containers 145 with the service instances 140 they require. Thus, this method 500 or similar may be performed by the bridge container 135 for each service instance 140.

As shown in FIG. 5, at block 501, the bridge container 135 analyzes the address space (i.e., the runtime environment) of a service instance 140 running on the host system 125. The address space may contain one or more running processes that belong to the same runtime instance. Additionally, the address space may indicate one or more jobs in a job log 150, where each job may be identified based on the naming pattern specified in the feature pattern table 155, specifically in the Start Job Pattern column, for instance. At block 502, the bridge container 135 determines the status of each job being run by the service instance 140. In some embodiments of the invention, this is performed by checking the job log 150 of the service instance 140. In some embodiments of the invention, the job log 150 is a process log that includes, for instance, a source file and runtime information of each job running on the service instance 140, as well as a status of each job. At block 503, the bridge container 135 requests a status of a service, such as through the RESTful API, and the service instance 140 may reply with information about the health of the service as a whole. At block 504, the bridge container 135 may get connection details (e.g., data needed to connect) and connection properties (e.g., a location) of the service instance 140, which may be performed through the RESTful API as well.

At block 505, the bridge container 135 updates records of the bridging system 100 based on the information discovered about the service instance 140. For example, the bridge container 135 may update the service location table 160 with connection details and connection properties of the service instance 140. For another example, the bridge container 135 may update the job list 165 of the service instance 140 to indicate the status of jobs being handled by the service instance 140. Additionally, for each service instance 140 for which a virtual container 130 already exists, the virtual service registry 185 is updated at block 506. If a virtual container 130 does not yet exist for the service instance 140, then as described above, such a virtual container 130 may be initiated and the virtual service registry 185 may be updated as part of the above-described method 300 of bridging services.

FIG. 7 illustrates an example service location table 160 according to some embodiments of the invention. As mentioned above, the service location table 160 may be among the records updated by the bridge container 135, at block 505 of the method 500 FIG. 5. The service location table 160 may include a record corresponding to each service instance 140 known to be running on the host system 125. As shown in FIG. 7, the service location table 160 may include the following columns, for example: Instance ID, Service Name, Connection Details, Connection Properties, and Status. The Instance ID may be a unique identifier for a service instance 140. The Service Name may be the name of the service provided by the service instance 140. The Connection Details column may describe the connection, such as by indicating a Secure Sockets Layer (SSL) option, an account name, or in the case of a DB2 service, one or more table names or table options. In contrast, the Connection Properties may indicate how to connect to the service instance, such as by indicating a Uniform Resource Locator (URL) or port. Information stored in the Connection Details and Connection Properties columns may be obtained through RESTful API as described above.

In some embodiments of the invention, each of the feature pattern table 155 and the service location table 160 may be updateable. In some embodiments of the invention, a meet-in-the-middle approach is used, in which the service location table 160 is built proactively based on dynamic analysis of job logs 150, as described above. As such, a required service may be identified quickly without an additional discovery process. Further, if there is a change in a service instance 140, that change may be detected through the dynamic analysis as well, or that change may be indicated in the feature pattern table 155, which may be read by the bridge container 135, which may update the service location table 160 accordingly. For another example, in some embodiments of the invention, the service location table 160 may be built passively, such as when a source container 145 broadcasts its need for a required service, responsive to which the bridge container 135 may identify a service instance 140 of that service and may update the service location table 160 accordingly.

As discussed above, the control center 170 may maintain or control aspects of the bridging system 100 from outside the container scope 115. The control center 170 may have various responsibilities, such the following, for example: maintaining the virtual service registry 185, maintaining the normal service registry 180, maintaining a provision file 175 for each service instance 140, monitoring heartbeats of service instances 140, and restarting service instances 140 as needed. For instance, as described above, virtual containers 130 may be registered with the virtual service registry 185. More specifically, registering of a virtual container 130 may occur when the virtual container 130 or the bridge container communicates, to the control center 170, information describing the service virtualized by the virtual container 130. The control center 170 may in turn update the virtual service registry 185 and the normal service registry 180 with information about the virtual container 130.

FIG. 8 is an example virtual service registry 185 according to some embodiments of the invention. In some embodiments of the invention, the virtual service registry 185 includes a record corresponding to each service. As shown in FIG. 8, the virtual service registry 185 may be a table including the following columns, for example: Application Name, Service Name, Instance ID, Active Status, and Provision File. Generally, the Application Name is the name of an application that provides the service; Service Name is the name of the service (e.g., DB2); Instance ID is an identifier of a service instance 140 providing the service; Virtual Container ID is an identifier of a virtual container 130 virtualizing the service through communication with the service instance 140; Active Status indicates whether the service instance 140 is active; and Provision File indicates a filename of the provision file 175 for the service instance 140.

In some embodiments of the invention, each service instance 140 broadcasts heartbeats indicating that the service instance 140 is up and running, and the control center 170 listens for the heartbeats of the various service instances 140. If the control center 170 determines that a service instance 140 is down (e.g., due to not receiving one or more expected heartbeats), the control center 170 may bring restart the service instance 140 based on the applicable provision file 175. Generally, a provision file 175 is a type of build file that may include an image of the service instance 140 at a healthy point in time. The control center 170 may update the provision file 175 of each service instance 140 from time to time, such as when updates are received from the bridge container 135. If a service instance 140 is deemed to be down (e.g., if a predetermined number of heartbeats are not detected), then the control center 170 may provision a new service instance 140 based on the provision file 175 of the service instance 140, effectively replacing the service instance 140 with a healthy version of itself.

FIG. 9 is a block diagram of a computer system 900 for implementing some or all aspects of the bridging system 100, according to some embodiments of this invention. The bridging systems 100 and methods described herein may be implemented in hardware, software (e.g., firmware), or a combination thereof. In some embodiments, the methods described may be implemented, at least in part, in hardware and may be part of the microprocessor of a special or general-purpose computer system 900, such as a personal computer, workstation, minicomputer, or mainframe computer. For example, and not by way of limitation, the host system 125 may be one or more computer systems 900 or portions thereof, and thus, the bridging system 100 may be implemented as at least a portion of a computer system 900 as shown in FIG. 9.

In some embodiments, as shown in FIG. 9, the computer system 900 includes a processor 905, memory 910 coupled to a memory controller 915, and one or more input devices 945 and/or output devices 940, such as peripherals, that are communicatively coupled via a local I/O controller 935. These devices 940 and 945 may include, for example, a printer, a scanner, a microphone, and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computer system 900, a semiconductor-based microprocessor (in the form of a microchip or chip set), a macroprocessor, or other device for executing instructions. The processor 905 includes a cache 970, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 970 may be organized as a hierarchy of more cache levels (L1, L2, etc.).

The memory 910 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 9, the instructions in the memory 910 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 920, which may be a storage device such as a hard disk drive or solid-state drive. The stored instructions in memory 910 or in storage 920 may include those enabling the processor to execute one or more aspects of the bridging systems 100 and methods of this disclosure.

The computer system 900 may further include a display controller 925 coupled to a display 930. In some embodiments, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In some embodiments, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Bridging systems 100 and methods according to this disclosure may be embodied, in whole or in part, in computer program products or in computer systems 900, such as that illustrated in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a bridge container running inside a container scope, connection information of available service instances wherein the determining of the connection information is based on a feature pattern table
    listing the available service instances;
storing, by the bridge container, the connection information of the available service instances in a service location table;
determining, by the bridge container, that a first source container inside the container scope requires a first service of a first service instance, wherein the first service instance includes a required feature;
determining, by the bridge container that a first container corresponding to the first service instance does not exist inside the container scope, wherein the determining that the first container exists is performed by the bridge container checking a normal service registry and a virtual service registry; and
based on determining that the first source container inside the container scope requires the first service of the first service instance and that the first container corresponding to the first service instance does not exist inside the container scope:
    determining, by the bridge container if the first service instance including the required feature is available outside the container scope, wherein the determining of the availability is based on the feature pattern table describing the features of available services;
    In response to determining the first service instance is available:
        initializing, by the bridge container, a first virtual container inside the container scope;
        obtaining, by the bridge container, using the service location table, connection information about the first service instance running to provide the first service outside the container scope;
        connecting, by the bridge container, the first virtual container to the first service instance to virtualize the first service instance inside the container scope, wherein the connecting utilizes the obtained connection information about the first service instance;
        connecting, by the bridge container, the first source container to the first virtual container to enable the first source container to access the first service instance through the first virtual container;
        updating the virtual service registry to include the first virtual container; and
        based on the updated virtual service registry, connecting at least one other source container inside the container scope to the first virtual container to enable the at least one other source container to access the first service instance through the first virtual container.

2. The computer-implemented method of claim 1, further comprising:
listening to one or more source containers inside the container scope to determine a set of required services, the set of required services comprising a respective service required by each source container of the one or more source containers;
identifying a set of service instances comprising a respective service instance of each service in the set of required services;
initializing a set of virtual containers comprising a respective virtual container corresponding to each service instance in the set of service instances;
connecting each virtual container in the set of virtual containers to the respective service instance to which the virtual container corresponds; and
connecting each source container of the one or more source containers to the respective virtual container connected to the service instance of the respective service required by the source container.

3. The computer-implemented method of claim 1, further comprising: detecting that a second source container requires a second service; checking the virtual service registry to identify a second virtual container virtualizing a second service instance that provides the second service; and connecting the second source container to the second virtual container, based on the second virtual container virtualizing the second service instance.

4. The computer-implemented method of claim 1, further comprising:
detecting a change in the connection information about the first service instance; and
updating the first virtual container to reflect the change in the connection information about the first service instance.

5. The computer-implemented method of claim 1, further comprising:
monitoring, by a control center outside the container scope, a plurality of heartbeats of one or more service instances running outside the container scope; and
restarting, by the control center, the first service instance upon detecting a failure in the first service instance.

6. A system comprising:
a memory having computer-readable instructions; and
one or more processors for executing the computer-readable instructions, the computer-readable instructions comprising:
determining, by a bridge container running inside a container scope, connection information of available service instances wherein the determining of the connection information is based on a feature pattern table listing the available service instances;
storing, by the bridge container, the connection information of the available service instances in a service location table;
determining, by the bridge container, that a first source container inside the container scope requires a first service of a first service instance, wherein the first service instance includes a required feature;
determining, by the bridge container that a first container corresponding to the first service instance does not exist inside the container scope, wherein the determining that the first container exists is performed by the bridge container checking a normal service registry and a virtual service registry; and
based on determining that the first source container inside the container scope requires the first service of the first service instance and that the first container corresponding to the first service instance does not exist inside the container scope:
    determining, by the bridge container if the first service instance including the required feature is available outside the container scope, wherein the determining of the availability is based on the feature pattern table describing the features of available services;
    In response to determining the first service instance is available:
        initializing, by the bridge container, a first virtual container inside the container scope;
        obtaining, by the bridge container, using the service location table, connection information about the first service instance running to provide the first service outside the container scope;

connecting, by the bridge container, the first virtual container to the first service instance to virtualize the first service instance inside the container scope, wherein the connecting utilizes the obtained connection information about the first service instance;

connecting, by the bridge container, the first source container to the first virtual container to enable the first source container to access the first service instance through the first virtual container;

updating the virtual service registry to include the first virtual container; and based on the updated virtual service registry, connecting at least one other source container inside the container scope to the first virtual container to enable the at least one other source container to access the first service instance through the first virtual container.

7. The system of claim 6, the computer-readable instructions further comprising:

listening to one or more source containers inside the container scope to determine a set of required services, the set of required services comprising a respective service required by each source container of the one or more source containers;

identifying a set of service instances comprising a respective service instance of each service in the set of required services;

initializing a set of virtual containers comprising a respective virtual container corresponding to each service instance in the set of service instances;

connecting each virtual container in the set of virtual containers to the respective service instance to which the virtual container corresponds; and connecting each source container of the one or more source containers to the respective virtual container connected to the service instance of the respective service required by the source container.

8. The system of claim 6, the computer-readable instructions further comprising:

detecting that a second source container requires a second service;

checking the virtual service registry to identify a second virtual container virtualizing a second service instance that provides the second service; and connecting the second source container to the second virtual container, based on the second virtual container virtualizing the second service instance.

9. The system of claim 6, the computer-readable instructions further comprising:

detecting a change in the connection information about the first service instance; and updating the first virtual container to reflect the change in the connection information about the first service instance.

10. The system of claim 6, the computer-readable instructions further comprising:

monitoring, by a control center outside the container scope, a plurality of heartbeats of one or more service instances running outside the container scope; and restarting, by the control center, the first service instance upon detecting a failure in the first service instance.

11. A computer-program product for bridging a connection to a service instance outside a container scope, the computer-program product comprising a computer-readable storage medium having program instructions embodied therewith, the program instructions executable by a processor to cause the processor to perform a method comprising:

determining, by a bridge container running inside a container scope, connection information of available service instances wherein the determining of the connection information is based on a feature pattern table listing the available service instances;

storing, by the bridge container, the connection information of the available service instances in a service location table;

determining, by the bridge container, that a first source container inside the container scope requires a first service of a first service instance, wherein the first service instance includes a required feature;

determining, by the bridge container that a first container corresponding to the first service instance does not exist inside the container scope, wherein the determining that the first container exists is performed by the bridge container checking a normal service registry and a virtual service registry; and based on determining that the first source container inside the container scope requires the first service of the first service instance and that the first container corresponding to the first service instance does not exist inside the container scope:

determining, by the bridge container if the first service instance including the required feature is available outside the container scope, wherein the determining of the availability is based on the feature pattern table describing the features of available services;

In response to determining the first service instance is available:

initializing, by the bridge container, a first virtual container inside the container scope;

obtaining, by the bridge container, using the service location table, connection information about the first service instance running to provide the first service outside the container scope;

connecting, by the bridge container, the first virtual container to the first service instance to virtualize the first service instance inside the container scope, wherein the connecting utilizes the obtained connection information about the first service instance;

connecting, by the bridge container, the first source container to the first virtual container to enable the first source container to access the first service instance through the first virtual container;

updating the virtual service registry to include the first virtual container; and based on the updated virtual service registry, connecting at least one other source container inside the container scope to the first virtual container to enable the at least one other source container to access the first service instance through the first virtual container.

12. The computer-program product of claim 11, the method further comprising:

listening to one or more source containers inside the container scope to determine a set of required services, the set of required services comprising a respective service required by each source container of the one or more source containers;

identifying a set of service instances comprising a respective service instance of each service in the set of required services;

initializing a set of virtual containers comprising a respective virtual container corresponding to each service instance in the set of service instances;

connecting each virtual container in the set of virtual containers to the respective service instance to which the virtual container corresponds; and connecting each source container of the one or more source containers to the respective virtual container connected to the service instance of the respective service required by the source container.

13. The computer-program product of claim 11, the method further comprising:

detecting that a second source container requires a second service;

checking the virtual service registry to identify a second virtual container virtualizing a second service instance that provides the second service; and connecting the second source container to the second virtual container, based on the second virtual container virtualizing the second service instance.

14. The computer-program product of claim 11, the method further comprising:

detecting a change in the connection information about the first service instance; and updating the first virtual container to reflect the change in the connection information about the first service instance.

\* \* \* \* \*